(12) United States Patent
Benten

(10) Patent No.: US 8,135,177 B2
(45) Date of Patent: Mar. 13, 2012

(54) MOTION DETECTION DEVICE

(75) Inventor: Harold Gerardus Pieter Hendriku Benten, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 858 days.

(21) Appl. No.: 12/067,962

(22) PCT Filed: Sep. 26, 2006

(86) PCT No.: PCT/IB2006/053488
§ 371 (c)(1),
(2), (4) Date: Mar. 25, 2008

(87) PCT Pub. No.: WO2007/036873
PCT Pub. Date: Apr. 5, 2007

(65) Prior Publication Data
US 2008/0205710 A1 Aug. 28, 2008

(30) Foreign Application Priority Data
Sep. 27, 2005 (EP) ..................... 05108908

(51) Int. Cl.
*G06K 9/00* (2006.01)
*H04N 7/18* (2006.01)
(52) U.S. Cl. .................. 382/107; 348/154; 348/155
(58) Field of Classification Search .......... 382/103, 382/104, 107, 236; 348/14.1, 97, 154, 155, 348/352, 407.1, 413.1, 430, 715, 169, 208.1, 348/208.2, 208.16, 451; 375/240.1, 240.16; 396/153
See application file for complete search history.

(56) References Cited

U.S. PATENT DOCUMENTS

| | | | |
|---|---|---|---|
| 5,432,547 A | | 7/1995 | Toyama |
| 5,734,337 A | * | 3/1998 | Kupersmit .................. 340/937 |
| 6,278,736 B1 | * | 8/2001 | De Haan et al. .......... 375/240.16 |
| 6,647,361 B1 | * | 11/2003 | Laird et al. ........................ 703/8 |
| 6,757,328 B1 | * | 6/2004 | Huang et al. .............. 375/240.1 |
| 2004/0071319 A1 | | 4/2004 | Kikuchi |
| 2004/0234136 A1 | | 11/2004 | Zhu et al. |
| 2005/0031038 A1 | | 2/2005 | Zhang et al. |
| 2006/0269104 A1 | * | 11/2006 | Ciolli ............................. 382/104 |

OTHER PUBLICATIONS

Michael Meyer, et al: A New System for Video-Based Detection of Moving Objects and its Integration into Digital Networks, Security Technology, IEEE, Oct. 2, 1996, pp. 105-110.

(Continued)

*Primary Examiner* — Abolfazl Tabatabai
(74) *Attorney, Agent, or Firm* — Larry Liberchuk

(57) ABSTRACT

The invention refers to a device, a method and a computer program product for extracting motion information from a sequence of video frames. Existing solutions for extracting motion information from sequence of video frames need a massive computing power which make it difficult and expensive to implement a real-time system. It is therefore an object of the invention to simplify such a device and to provide a real-time embedded system. It is suggested to provide a device comprising a digital video camera 1. The video camera 1 includes a processing unit 3 for processing video frames grabbed by the video camera 1. The processing uses a 3D recursive search block matching algorithm to extract the motion information from the video frames. The device can be used for traffic surveillance applications, e.g. for determining the speed of vehicles on the streets and roads.

12 Claims, 5 Drawing Sheets

OTHER PUBLICATIONS

Gerard De Haan, et al: True-Motion Estimation with 3-D Recursive Search Block Matching, IEEE, Transactions on Circuits and Systems for Video Technology, vol. 3, No. 5, Oct. 1, 1993, pp. 368-379.

Daniel J,. Dailey, et al: An Algorithm to Estimate Mean Traffic Speed Using Uncalibrated Cameras, IEEE Transactions on Intelligent Transportation Systems, vol. 1, No. 2, Jun. 2000, pp. 98-107.

Kit Ming Chan, et al: Motions of Multiple Objects Detection Based on Video Frames, Department of Electronic and Information Engineering, The Hong Kong Polytechnic Univ, pp. 62-66.

Nelson H. C. Yung, et al: An Effective Video Analysis Method for Detecting Red Light Runners, IEEE, Transactions on Vehicular Technology, vol. 50, No. 4, Jul. 2001, pp. 1074-1084.

* cited by examiner

MOTION DETECTION DEVICE

The invention refers to the field of video processing and provides a device, a corresponding method and a computer program product for extracting motion information from a sequence of video frames. The invention can be used in surveillance applications, e.g. traffic surveillance applications, and for the detection of an intrusion into buildings or premises.

Motion information can be of great importance in a number of applications, including traffic monitoring, tracking people, security and surveillance. For example, with the increasing number of vehicles on the road, many cities now face significant problems with traffic congestion. Major cities in the world now use traffic guiding systems to remedy these situations and to use existing infrastructure more efficiently. For doing that systems are necessary which monitor a multitude of vehicles simultaneously, in real-time and with low costs.

Digital video processing evolved tremendously over the last couple of years. Numerous publications have tackled the problem of detecting the movements of objects such as cars or of persons. Even for a relatively simple task such as speed estimation of vehicles existing solutions use a combination of memory intensive algorithms and/or algorithms which need a massive computing power. Algorithms being known for that purpose make use of object recognition, object tracking, or make a comparison of images taken at different moments in time. It is therefore difficult and expensive to implement a real-time system for such applications.

True motion estimation is a video processing technique applied in high-end TV sets. These TV sets use a frame rate of 100 Hz instead of the standard 50 Hz. This makes it necessary to create new video frames by means of interpolation. For doing that with a high frame quality the motion of pixel blocks within the two dimensional frames is estimated. This can be done by a 3D recursive search block matching algorithm as described in the document of Gerard de Haan et al, "True motion estimation with 3D-recursive search block matching", IEEE transactions on circuits and systems of video technology, volume 3, number 5, October 1993. This algorithm subdivides a frame into blocks of 8×8 pixels and tries to identify the position of this block in the next frame. The comparison of these locations makes it possible to assign a motion vector to each pixel block which comprises the ratio of the pixels placement of the block and the time between two frames.

U.S. Pat. No. 6,757,328 B1 discloses a method for extracting motion information from a video sequence. The video sequence used by this US patent already contains motion vectors inherent to the video stream, e.g. an MPEG stream. The motion vectors are extracted from the encoded video stream. These motion vectors in the MPEG stream have been created by the encoding process, such that they do not represent a true motion. As an example, the MPEG stream contains motion vectors pointing to the left although the object might carry out a movement to the right. In order to solve this problem a filtering step is carried out to remedy the poor quality of the motion vectors. After the filtering step the authors of this US patent use the motion information for traffic surveillance applications.

It is an object of the invention to provide a device, a method and a computer program product for extracting motion information from a sequence of video frames which can be used for video frames which are not encoded.

Another object of the invention is to carry out an extraction of motion information which is simple and highly efficient such that a real-time processing is possible.

This object and other objects are solved by the features of the independent claims. Preferred embodiments of the invention are described by the features of the dependent claims. It should be emphasized that any reference signs in the claims shall not be construed as limiting the scope of the invention.

According to a first aspect of the invention the above mentioned object is solved by a device for extracting motion information from a sequence of video frames which comprises a digital video camera for grabbing the video frames. Furthermore, the device comprises a processing unit for processing the video frames provided by the video camera, whereby the processing unit is adapted to use a 3D recursive search block algorithm to determine whether the video frames show an object or a person which is moving.

According to the invention extraction of motion information is done by a video sequence which is not encoded. That means that if a video sequence is already encoded, e.g. because it is an MPEG video stream, it needs to be decoded first. The reason is that the algorithm for extracting motion information, which will be discussed in detail below, operates on the pixels of the video frames.

When operating the device the digital video camera grabs a sequence of video frames, and the processing unit processes the digital video frames from the digital video camera in order to extract a motion information. This processing is done by using a recursive search block algorithm to determine whether the video frames show an object or person which is moving.

It goes without saying that the method can be carried out by using a computer program product using the underlying algorithm. The computer program product comprises a computer readable medium, having thereon computer program code means, when said program is loaded, to make the computer executable for determining whether the video frames show an object or a person which is moving, or generally for carrying out the method which will be explained below in more detail.

A sequence of video frames is provided by digital video camera of arbitrary type, e.g. a CMOS, CCD, or infrared video camera which is fixed or which is moving. The digital video camera is not part of the present invention, such that it does not need further explanation.

The processing unit may be
a) processor and a corresponding computer program. As an example, the processor might be a Trimedia processor or an Xetal processor of Philips, e.g. a Philips PNX 1300 chip comprising a TM 1300 processor.
b) a dedicated chip, for example an ASIC or a FPGA
c) an integral path of an existing chip of the video camera hardware, or
d) a combination of the possibilities mentioned above.

The preferred choice depends on system aspects and on product requirements. A preferred embodiment of the processing unit uses an extra card to be inserted in a digital video camera having a size of 180 mm×125 mm and comprising a Philips PNX1300 chip, which itself comprises a Philips TN1300 processor. Furthermore, the card uses 1 MB of RAM for two frame memories and one vector memory.

The processing unit uses a 3D recursive search block (3DRS) algorithm to extract motion information from the video frames. The algorithm works in the way as described by Gerard de Haan et al, "True motion estimation with 3D recursive search block matching", IEEE transactions on circuits and systems of video technology, volume 3, number 5, October 1993, to which this application explicitly refers to and which is incorporated by reference.

The device according to the invention has the advantage that it can be universally applied to video sequences which are not encoded. There is thus no need to encode the video sequences prior to processing them, and it is not necessary to make a financial investment into corresponding software or hardware.

Another advantage of the device is that the motion vectors calculated by the 3DRS algorithm represent the true motion of an object or person, such that there is no need to postprocess acquired motion vectors in order to improve their quality to an acceptable level. This is however important for the application of the device: if the device is used for speed measurements the reliability and the accuracy of the speed values is high when the motion vectors represent true motion, and is lower when a postprocessing of the motion vectors is necessary.

Still another advantage of the device is that the 3DRS algorithm is extremely efficient, even in comparison to other known block matching algorithms, such that the design of a device which is operating in real-time becomes straightforward. In doing that there is a high degree of freedom as far as the choice of the processing unit is concerned, such that the execution of the 3DRS algorithm can be implemented in hardware as well as in software.

According to a preferred embodiment of the invention the processing unit is adapted to determine the velocity of the object or person captured by the video frames of the video sequence. This can be done as follows. The 3DRS algorithm processes the complete frame in blocks of pixels, e.g. 8×8 pixels per block. The 3DRS-algorithm outputs one motion vector for each 8×8 block of pixels. Each vector has an x- and a y-component, whereby x and y represent a two-dimensional Cartesian coordinate system with a horizontal x-axis pointing to the right, and a vertical y-axis pointing to the top, cf. FIG. 3. The absolute value of the motion vector represents the velocity measured in pixels or in fractions of pixels, e.g. in quarter pixels.

As an example it is assumed that the x-value of the motion vector is 12, and that the y-value of the motion vector is −37 for a certain position, e.g. for a block of 8×8 pixels in the frame. Furthermore, a quarter pixel accuracy is assumed. This means that this particular block is moving with a speed of 12×0.25=4 pixels to the right because the x-value is positive, and 37×0.25=9.25 pixels downwards because the y-value is negative.

The conversion of the motion vectors into actual speeds or velocities is as follows. In the first step the x- and y-component is used to calculate the length of a motion vector, denoted by veclength, in the direction of the motion which is given by $$veclength = \sqrt{v_x^2 + v_y^2} \quad \text{(equation 1)}$$

(in units of pixels), whereby $v_x$ is the x-component and whereby the $v_y$ is the y-component of this velocity.

Since the frame frequency, e.g. 25 Hz, is known from the digital video camera the velocity of the object in pixels per second (pps) is calculated by means of $$speed\_pps = veclength * frame\_freq \quad \text{(equation 2)}$$

whereby frame_freq denotes the frame frequency.

The velocity in pixels per second, denoted by speed_pps, is converted into the actual speed in meters per second (mps), denoted by speed_mps, by dividing it with a conversion factor according to $$speed\_mps = \frac{speed\_pps}{conv\_factor} \quad \text{(equation 3)}$$

whereby conv_factor denotes said conversion factor responsible for converting a distance in pixels into a distance in meters. Lastly, the velocity in m/s is expressed in km/h or miles/h for easier interpretation.

The conversion factor is determined only once when the device is calibrated. Its value depends on the location of the object. e.g. a vehicle, in the frame. Each location has its own conversion factor, whereby its value can be extracted from information present in the frame itself. This can be done when a known distance, e.g. in meters, is measured in pixels. An example would be to measure the distance, e.g. in meters, between adjacent lane marks in the middle of the road and comparing it with the corresponding distance in pixels. Other objects which can be used for that purpose are the distance between two objects next to the road, the vehicles themselves etc.

The velocity determined in this way is the average velocity between two frames. The expression velocity is used synonymously to the expression speed within this description. As the time difference between two frames is very small the measured velocity is in a good approximation the current velocity at a given time. It is however also possible to calculate the velocity between a multitude of two subsequent frames in order to carry out a velocity tracking from frame to frame. This in turn opens the way to calculate the average value of these velocity values.

According to a preferred embodiment of the invention, the processing unit is adapted to determine simultaneously the velocity of a multitude of objects or persons. The 3DRS algorithm processes whole frames such that all objects or persons captured by the frames and moving within these frames are processed. This makes it possible to use the invention for traffic surveillance applications, whereby the velocity of a multitude of vehicles should be checked, and which should preferably be checked simultaneously to efficiently control whether speed limits are obeyed.

Using the invention it is possible to differentiate whether the vehicles approach the camera or whether the vehicles move away from the camera. Furthermore, it is possible to monitor the velocity of vehicles on a multitude of lanes, and even to determine average velocities of the cars on the lanes. Determining the average velocity of said multitude of vehicles makes it possible to have an indicator whether there is a traffic congestion on the road.

According to a preferred embodiment of the invention, the processing system is located in the housing of a video camera. In this way the system becomes an embedded system which is easy to carry and easy to use. The hardware requirements for that purpose strongly depend on the application, and on the desired accuracy of the device. As an example, the device may comprise a mainboard having a size of 180×125 mm having a Philips PNX1300 chip comprising a Philips TM1300 processor, and having 1 MB RAM. This extra card can be integrated into the video camera to monitor traffic on motorways. However, hardware requirements are lower for devices designed to check whether a person is intruding a building or some premises. In the latter example a low resolution camera is sufficient, such that hardware requirements are lower.

In a further preferred embodiment the processing system is implemented as a real-time system. Achieving a real-time implementation depends on the capabilities of the hardware. Even existing hardware, such as a Philips TM1300 processor, can guarantee that the 3DRS algorithm works in real-time such that there is no need to store large amounts of data for offline processing. The underlying reason is that the 3DRS algorithm is extremely efficient and robust, requiring only 7 to 10 operations per pixel depending on the actual implementations and requirements.

In a further preferred embodiment of the invention the processing system is adapted to indicate the position of a moving object or a moving person. This capability is provided by post processing the multitude of motion vectors obtained by the 3DRS-algorithm. In the easiest case a moving object, e.g. a moving car on a road, defines a region with non-vanishing motion vectors, whereby a surrounding region has vanishing motion vectors. In this way the position of the object can be defined to be the center of said region with non-vanishing motion vectors.

In another preferred embodiment the processing system is adapted to carry out an object recognition. Doing this means comparing the size and shape of objects in the frames by algorithms which are known in the prior art, e.g. in order to differentiate persons from vehicles, and to differentiate among vehicles, e.g. to differentiate between cars and lorries.

In another embodiment of the invention the processing system is adapted to carry out a number plate recognition. The number plate recognition can be done with well known algorithms based on optical character recognition which is well known to the man skilled in the art. Number plate recognition is a useful capability of the device when the device shall be used for speed detection or for identifying vehicles which have passed red traffic lights.

A second aspect of the invention refers to a method for extracting motion information from a sequence of video frames. In the first step of this method a sequence of video frames is grabbed. In a second step the digital video frames grabbed by the video camera are processed, whereby processing is done by using a recursive search block algorithm to determine whether the video frames show an object or person which is moving. Again, the algorithm works in the way as described by Gerard de Haan et al, "True motion estimation with 3D recursive search block matching", IEEE transactions on circuits and systems of video technology, volume 3, number 5, October 1993, to which this application explicitly refers to and which is incorporated by reference.

The method according to the invention has the advantage that it can be universally applied to video sequences which are not encoded. Thus the method is not encoding video sequences prior to processing them. On the contrary, if an encoded video sequence shall be processed it is necessary to decode it first, as the method uses the 3DRS algorithm processing the pixels of the frames.

Another advantage of the method is that the motion vectors calculated by the 3DRS algorithm represent the true motion of an object or person, such that there is no need to postprocess acquired motion vectors to improve their quality to an acceptable level.

Still another advantage of the method is that the 3DRS algorithm is extremely efficient, even in comparison to other known block matching algorithms, such that the method is particularly fast, which makes it possible to process grabbed video sequences in real-time.

With the method mentioned above the velocity of the object or person can be determined, and even a multitude of objects and persons can be determined simultaneously. The method can be used for surveillance applications such as traffic surveillance. Another area where the method can be used is for road rule enforcement cameras, in particular as a speed camera or red light camera.

These and other aspects of the invention will be apparent from and elucidated with reference to the embodiments described thereafter. It should be noted that the use of reference signs shall not be construed as limiting the scope of the invention.

In the following preferred embodiments of the invention will be described in greater detail by way of example only making reference to the drawings in which.

Table 1 contains measurement values and conversion factors of the calibration.

Figure 1:
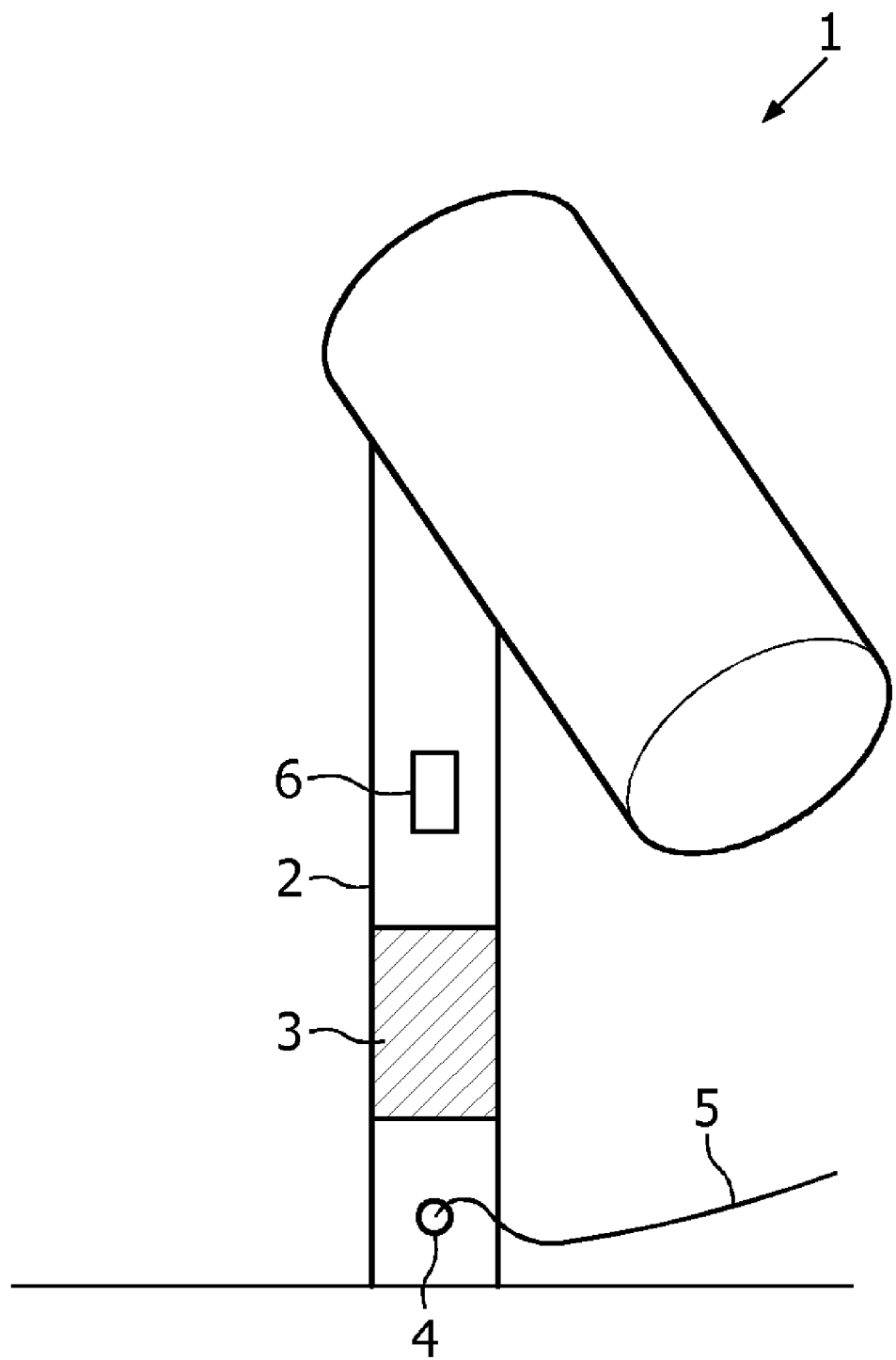
FIG. 1 shows a digital video camera for extracting motion information.

FIG. 1 shows a device according to the invention. It comprises a digital video camera 1 having a housing 2 including a processing unit 3. Furthermore, the digital video camera has an output port 4 for communicating with an external computer (not shown), e.g. via an Ethernet cable 5. The external computer might be located in a police station. In addition, the digital video camera 1 has an optional transceiver 6 for wireless transmissions of acquired data to the remote computer.

In a feasibility study a system was used which deviated from the digital video camera 1 as shown in FIG. 1. The digital video camera 1 was a Panasonic NV-DX110EG consumer video camera which is commercially available and which does need further explanation. This video camera 1 grabbed video frames at a frame rate of 25 Hz and outputted them via a 4-pin i.Link input/output port.

The outputted video sequence was transferred to a conventional notebook (not shown) and was stored in the AVI-forward at 25 Hz. For using the 3DRS-algorithm this compressed video format needed to be decoded first such that it was transferred to the YUV422 standard. The decoded video sequence had a resolution of 720×576 pixels and a frame rate of 25 Hz. A computer program based on a basic 3DRS-algorithm was used for processing the unencoded video sequence, without any preprocessing or postprocessing. This algorithm was executed on the notebook mentioned above. It yielded true motion vectors giving rise to a velocity values which could be trusted. Furthermore, the true motion vectors gave rise to a robust 3DRS algorithm working efficiently and thus very fast, such that the device processed the frames in real-time without preprocessing or postprocessing.

In operation, the first step consisted in installing the digital video camera and fixing it to the bridge over a motorway. In a second step it was tested whether the digital video camera generated a video sequence and thus functioned properly. In a third step the notebook mentioned above was used to calibrate the device by means of an application software. In other words the device according to the invention comprised, in the framework of the feasibility study, the digital video camera and the notebook. The notebook represented the processing unit comprising a processor and associated memory in the sense of alternative a) mentioned above.

Figure 2:
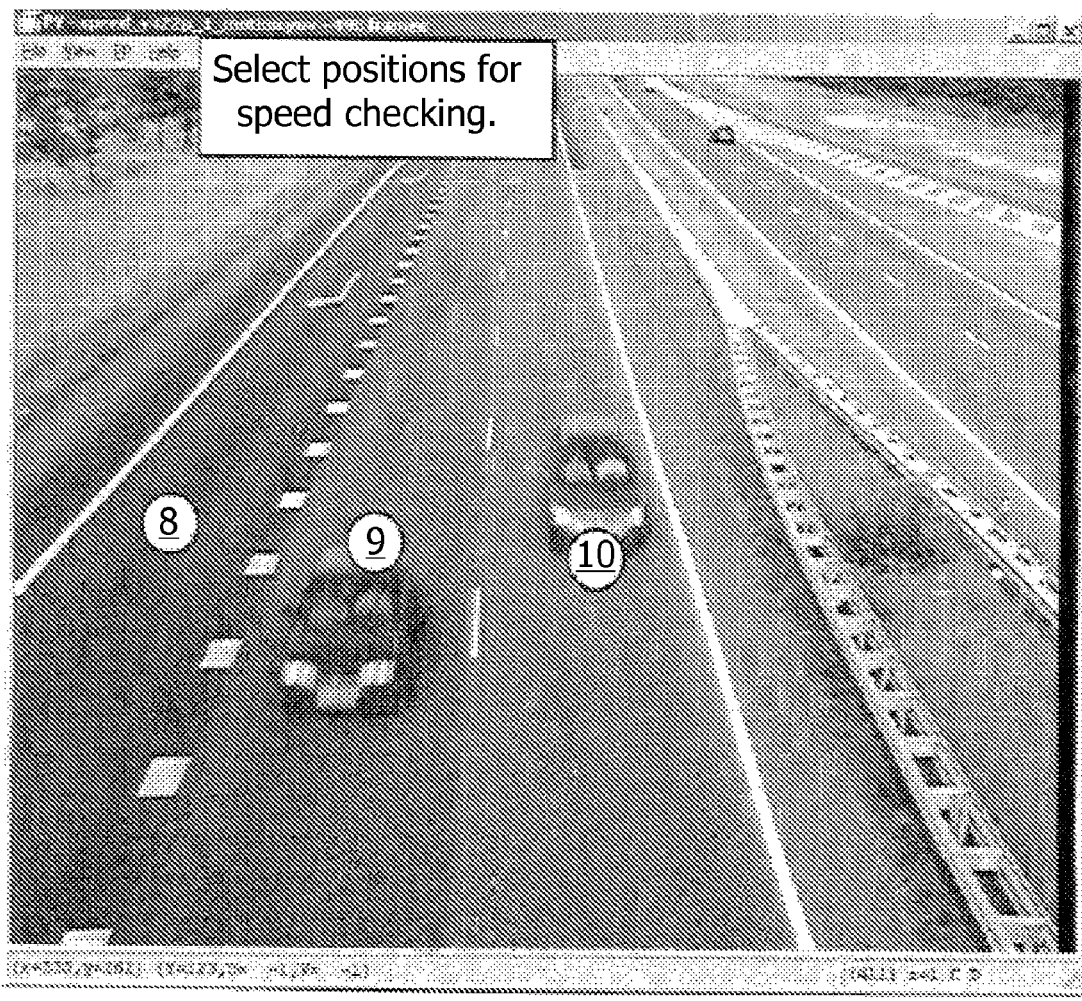
FIG. 2 illustrates the selection of locations for speed checking.
Figure 3:
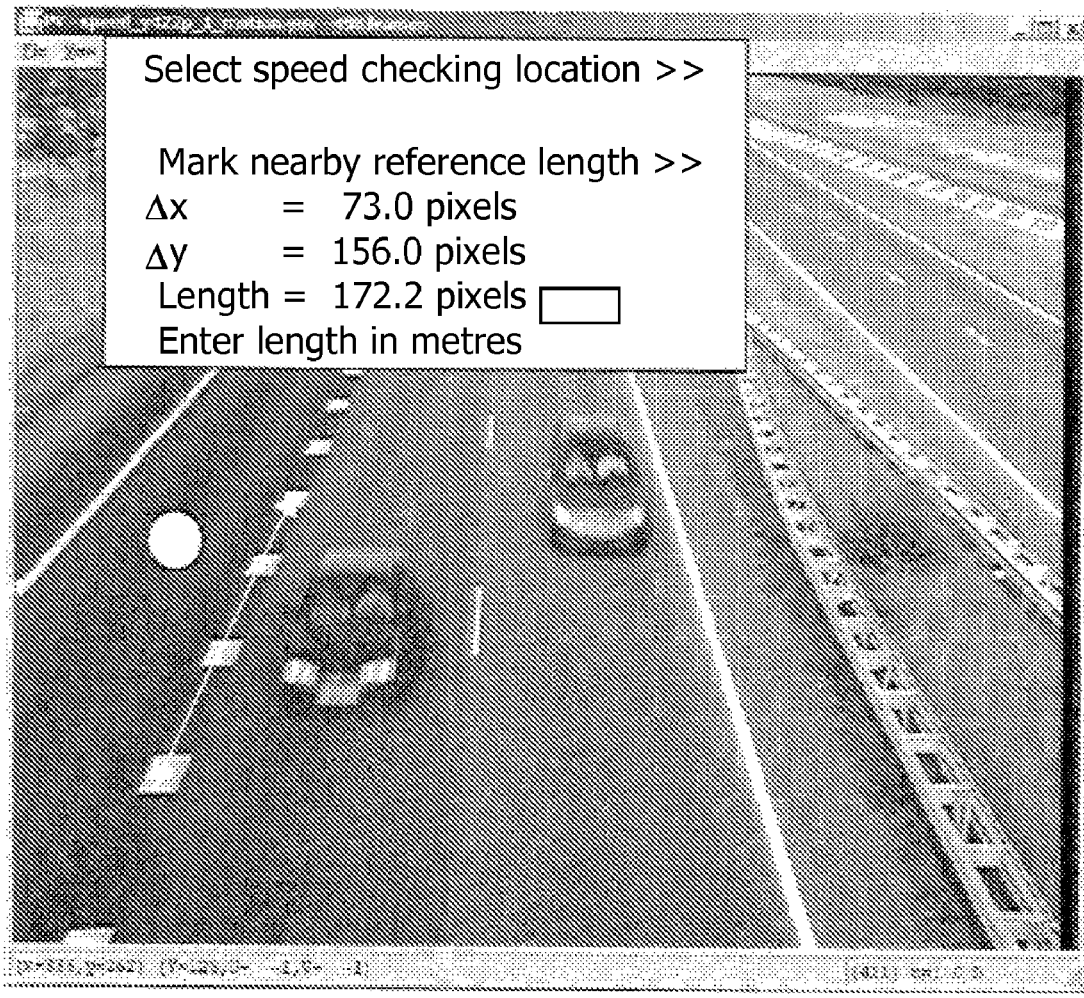
FIG. 3 illustrates the calibration of the device for speed checking locations.

A first calibration step consisted in selecting locations of the motorway where a speed checking should be performed. This is illustrated with the help of FIG. 2. FIG. 2 shows a motorway with three lanes with vehicles approaching the video camera. For each lane a measurement location 8, 9 and 10 is selected. Although the 3DRS-algorithm will start to estimate the speed of every object as soon as it enters the frame/image, selecting the proper positions requires some care. Good positions are not too close to the borders of the image and not too far into the background.

In the next calibration step the conversion factor conv_factor for calculating the speed of the vehicles with the help equation 3 has been determined. This was done for each measurement locations 8, 9 and 10. For that purpose the distance of four consecutive wide stripes between the leftmost lanes as indicated by the double arrow has been inputted into the application software in units of meter. The same distance has been calculated in units of pixels, namely $\Delta x=172.2$ pixels. From this value pixels the corresponding projections of this length onto the x-axis ($\Delta x=73$ pixels) and onto the y-axis ($\Delta y=156$ pixels) has been calculated. The conversion factor is used by the processing unit to convert the distances in the x- and y-direction from pixels into meters. The conversion factors are listed in column 6 of table 1.

After calibrating the device speed measurements have been performed. The notebook served as a processing unit and used a basic 3DRS-algorithm without any preprocessing or post-processing. The algorithm processed frames and subdivided the frames into blocks of pixels, namely 8×8 pixels per block.

Figure 4:
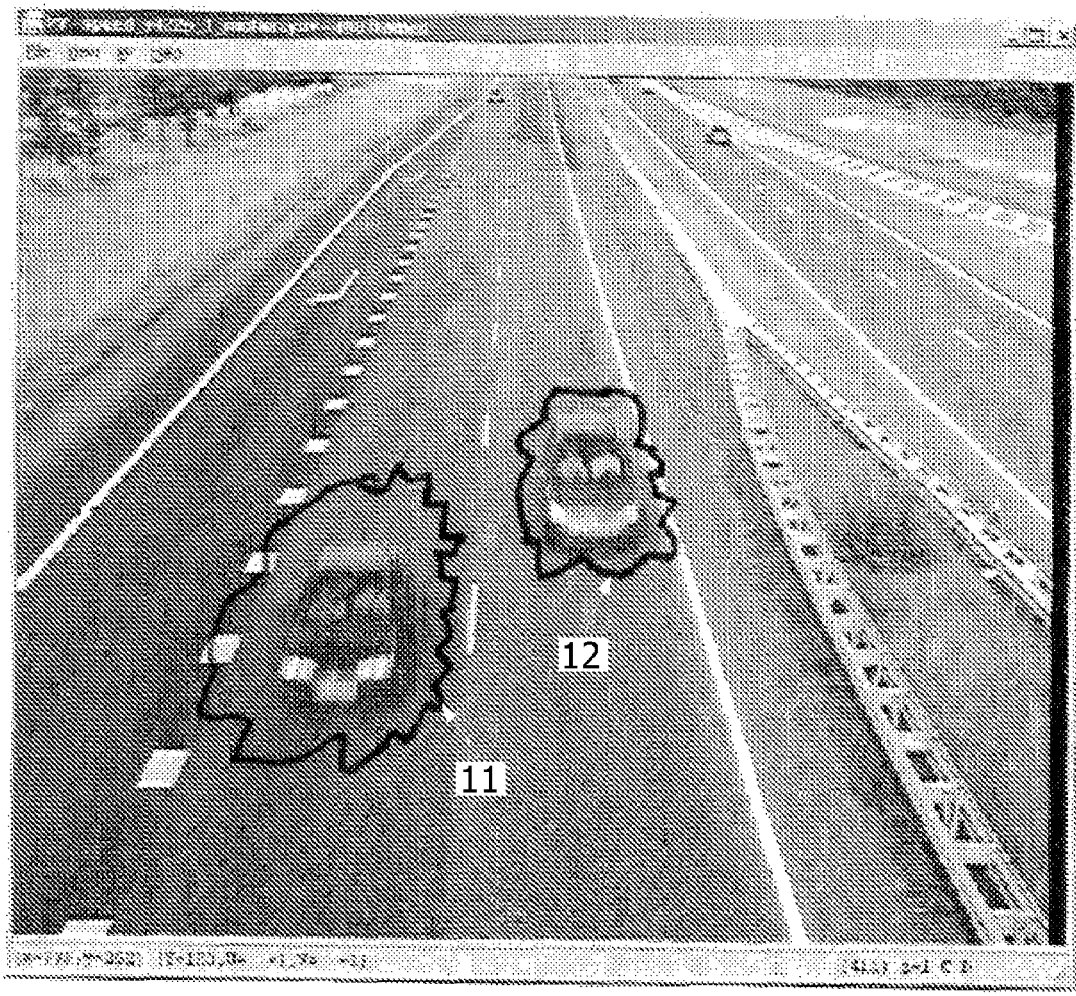
FIG. 4 is a measurement indicating areas with non-vanishing motion vectors

One such measurement is illustrated with the help of FIG. 4. The two cars approaching the camera are now encircled in order to indicate areas 11 and 12 where pixel blocks have been identified to have non-vanishing motion vectors. The average motion vector in the areas 11 and 12 respectively have been used to calculate the length of the motion vector with the help of equation 1. The frame rate had been 25 Hz, such that the speed of the car has been calculated with the help of equations 2 and 3 and the conversion factors listed in table 1. The results are shown in table 1.

It is remarkable that the measurement values even with this experimental setup had a very high accuracy which can be calculated with the help of $$\text{velocity\_error} = \frac{\text{frame\_freq} * \sqrt{2} * \varepsilon}{\text{conv\_factor}}, \quad \text{(equation 4)}$$

whereby $\varepsilon$ is the error in the motion vector, in this setup $\varepsilon=0.25$ pixel.

If it is assumed that the conversion factor is 7.50 which is the worst value in table 1, and the frame rate is 25 Hz, the velocity error is only 0.33 km/h. Even for this simplified experimental setup the accuracy can be regarded to be very good.

Figure 5:
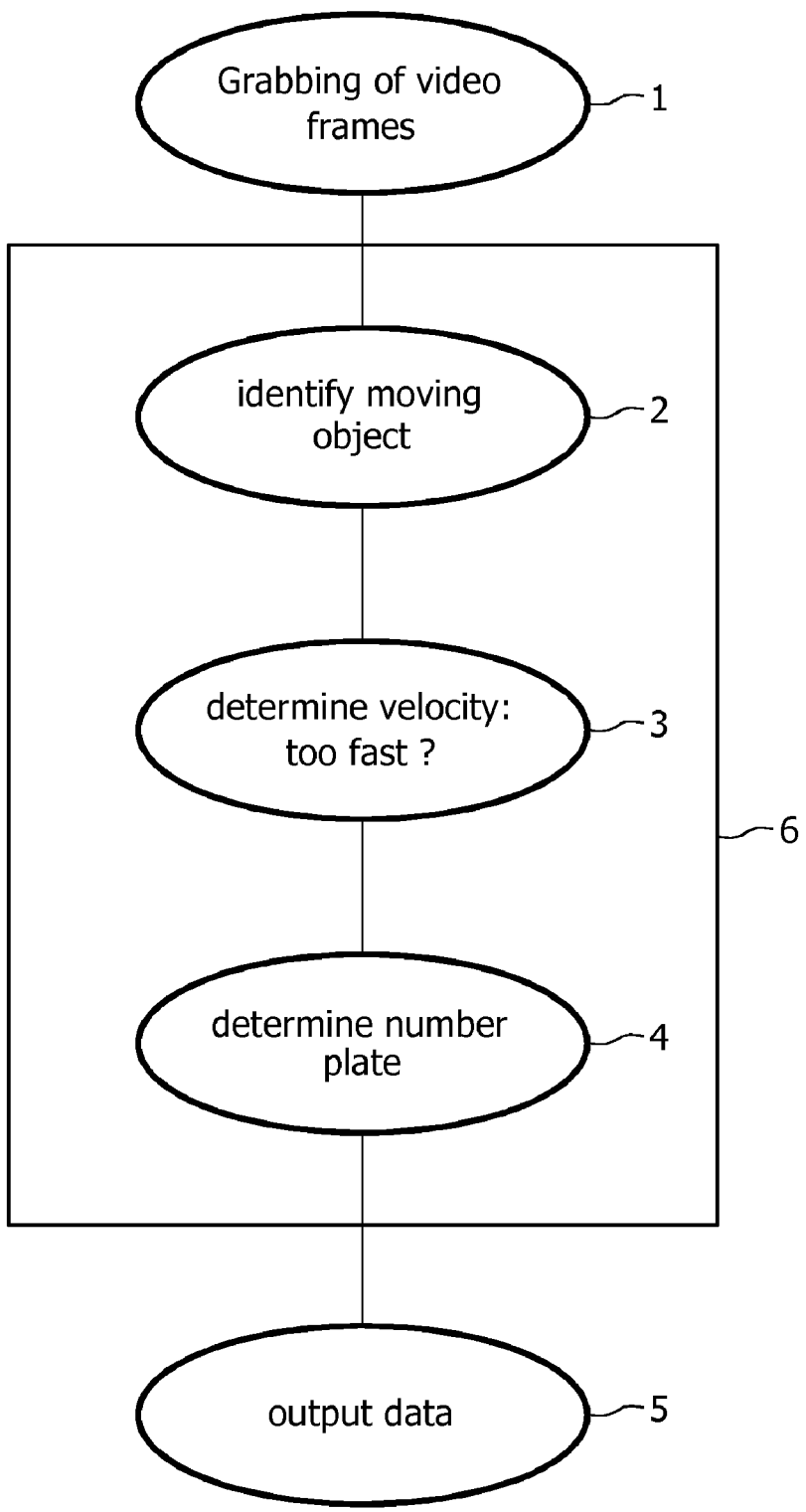
FIG. 5 depicts a flowchart for carrying out the invention.

Once calibrated the use of the device is illustrated with the help of the flowchart of FIG. 5. In step 1a grabbing of a sequence of video frames is carried out. These video frames are processed in step 6, and the results are outputted in step 5.

In the first processing step 2 the frames are analyzed by means of a 3DRS algorithm to identify a moving object within any of the measurement locations 8, 9 or 10 shown in FIG. 2. A moving object, e.g. a car, exists in these areas if there are pixel blocks with non-vanishing motion vectors in this region. In step 3 the velocity associated with this moving pixel blocks is determined and it is decided whether this velocity is too fast in comparison to an allowed value, e.g. 100 km/h for a motorway. If a velocity is too fast the number plate of the vehicle is extracted from the video frames in step 4. This is done by an additional computer program module as it is known in the prior art. In step 5 the data are outputted to an external computer which might be located in a police station. The data comprise the number plate, the speed and possibly a frame/image of the vehicle driving too fast.

LIST OF REFERENCE NUMERALS

| | |
|---|---|
| 1 | Digital video camera |
| 2 | Housing |
| 3 | Processing unit |
| 4 | Output port |
| 5 | Cable |
| 6 | Transceiver |
| 8 | Measurement location |
| 9 | Measurement location |
| 10 | Measurement location |
| 11 | Area |
| 12 | Area |

The invention claimed is:

1. A device for extracting motion information from unencoded video frames, comprising:
    a digital video camera for grabbing the unencoded video frames,
    a processing unit for processing the unencoded video frames provided by the video camera,
    the processing unit being adapted to use a recursive search block algorithm to determine whether the unencoded video frames show an object is moving or whether the unencoded video frames show a person is moving;
    wherein the processing unit is further adapted to determine the velocity of the object or the person, based on a frame rate of the unencoded video frames and a conversion factor for converting a pixel velocity into a physical velocity.

2. The device according to claim 1, wherein the processing unit is adapted to determine simultaneously the velocity of a multitude of objects or persons.

3. The device according to claim 1, wherein the processing unit is located in the housing of the video camera.

4. The device according to claim 1, wherein the processing unit is implemented as a real-time system.

5. The device according to claim 1, wherein the processing unit is adapted to indicate the position of the moving object or the moving person.

6. The device according to claim 1, wherein the processing unit is adapted to carry out an object recognition.

7. The device according to claim 1, wherein the processing unit is adapted to carry out a number plate recognition.

8. A method for extracting motion information from unencoded video frames, comprising:
    grabbing, by a digital video camera, the unencoded video frames,
    processing, by a processing unit, the unencoded digital video frames, the processing being carried out by using a recursive search block algorithm to determine whether the unencoded video frames show an object is moving or whether the unencoded video frames show a person is moving; and determining the velocity of the object or the person, based on a frame rate of the unencoded video and a conversion factor for converting a pixel velocity into a physical velocity.

9. The method according to claim 8, wherein the velocity of a multitude of objects or persons are determined simultaneously.

10. The method according to claim 8, wherein surveillance applications are used for detecting an intrusion into a building or into premises.

11. The method according to claim 8, wherein a road-rule enforcement camera is used.

12. A non-transitory computer readable medium, having thereon a computer program, when executed, for carrying out acts comprising:

grabbing the unencoded video frames; and processing the unencoded digital video frames, the processing being carried out by using a recursive search block algorithm to determine whether the unencoded video frames show an object is moving or whether the unencoded video frames show a person is moving; and determining the velocity of the object or the person, based on a frame rate of the unencoded video frames and a conversion factor for converting a pixel velocity into a physical velocity.

* * * * *